United States Patent [19]

MacDonald

[11] Patent Number: 4,603,502

[45] Date of Patent: Aug. 5, 1986

[54] FISHING LURE ASSEMBLY

[75] Inventor: Richard MacDonald, Naples, Fla.

[73] Assignee: Margaret H. MacDonald, Naples, Fla.

[21] Appl. No.: 798,045

[22] Filed: Nov. 14, 1985

[51] Int. Cl.$^4$ ............................................. A01K 97/04
[52] U.S. Cl. ...................................... 43/41; 43/42.06;
43/44.99
[58] Field of Search ....................... 43/41, 42.06, 44.99

[56] References Cited

U.S. PATENT DOCUMENTS

| 1,470,842 | 10/1923 | Hyams | 43/41 |
| 2,302,206 | 11/1942 | Gibson | 43/41 |
| 2,500,451 | 3/1950 | Codd | 43/41 |
| 2,541,847 | 2/1951 | Van Kirk | 43/41 |
| 2,556,634 | 6/1951 | Redinger | 43/41 |
| 2,740,224 | 4/1956 | Heiderich | 43/41 |
| 2,828,571 | 4/1958 | Caplan | 43/41 |
| 3,688,430 | 9/1972 | Balch | 43/41 |

FOREIGN PATENT DOCUMENTS 1015275 12/1965 United Kingdom ................... 43/41

Primary Examiner—Gene P. Crosby
Attorney, Agent, or Firm—John Cyril Malloy

[57] ABSTRACT

A lure structure formed of a transparent flexible material and designed to contain and display a bait fish, such as a shrimp, on the interior thereof wherein the chamber and associated housing are structured and dimensioned to allow free movement of the bait fish within the chamber and further include an apertured construction so as to allow free passage of water through the housing and into the chamber. The housing is slidedly connected to a supporting fishing line so as to allow sliding movement along a predetermined length thereof and substantially adjacent to a hook assembly.

15 Claims, 6 Drawing Figures

U.S. Patent   Aug. 5, 1986   4,603,502
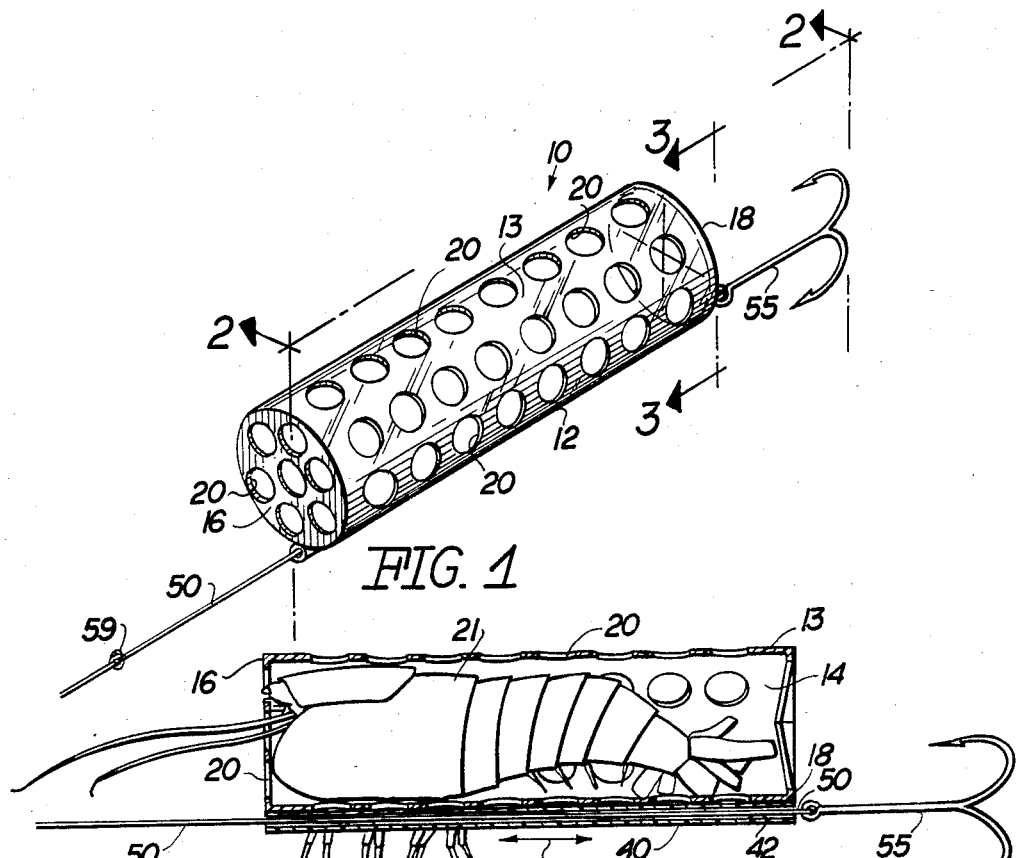
FIG. 1
FIG. 2
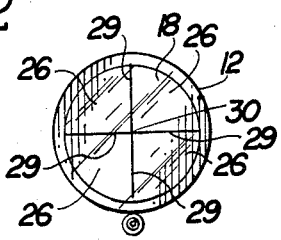
FIG. 3
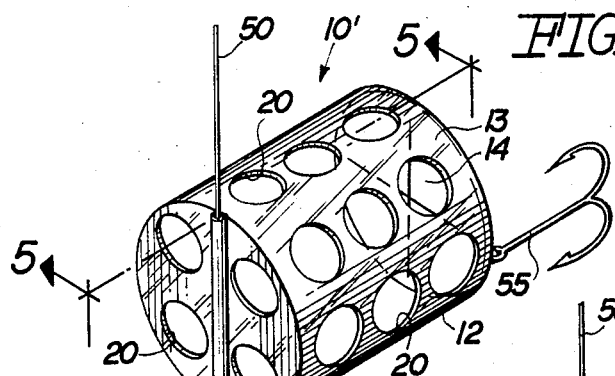
FIG. 4
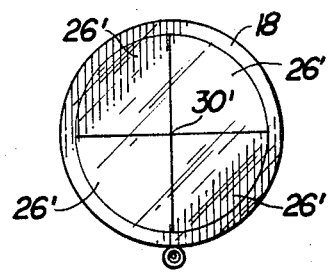
FIG. 6
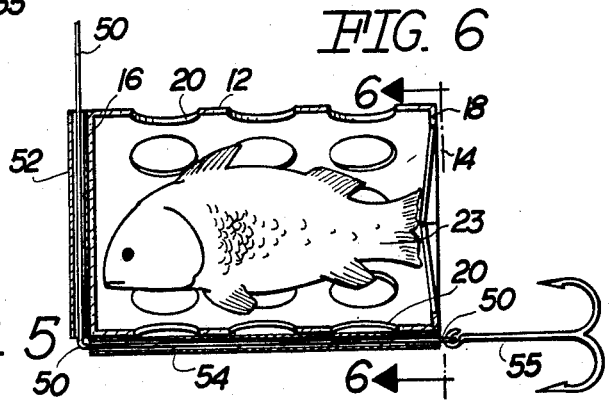
FIG. 5

FISHING LURE ASSEMBLY

BACKGROUND OF THE INVENTION

This invention relates to a fishing lure assembly designed to retain and display a live bait fish within an interior chamber wherein the structure of the housing of the lure is apertured and transparent so that free movement of the bait fish within the lure housing is observable, causing attraction of larger fish and hooking thereof by a hook assembly associated with or mounted adjacent to the subject lure housing.

DESCRIPTION OF THE PRIOR ART

Fishing lures of varying design and structural configuration have been utilized and existing in the prior art for many years. The actual designs of numerous existing prior art fishing lures varies greatly and frequently are dependent upon the type of fish being sought. While artificial lures have enjoyed great success for many years, there are many situations where fishing with live bait is more advantageous.

On the other hand, the utilization of live bait is often times expensive since the bait has to be replaced repeatedly due to the destruction and death of the live bait fish after each "strike" by a larger fish or even after a period of inactivity based upon a barbed hook being passed through the body of the bait fish.

Accordingly, the concept of combining live bait with a lure-type structure or assembly wherein the bait can be "protected" while at the same time be displayed originated many years ago. Structures of this type are disclosed in the U.S. Pat. Nos. to Welch, 489,110; Dales, 556,494; Hyams, 1,470,842; Gibson et al, 2,302,206; Van Kirk, 2,541,847; Redinger, 2,556,634; McCarthy, 2,592,445; Heiderich, 2,740,224; Caplan, 2,828,571 and Hicks, 3,760,526. The development of structures of the type mentioned above and disclosed in the above-referenced patents over a period of approximately 100 years is some indication that lure assemblies capturing and displaying live bait have had some success and are feasible.

However, general disadvantages associated with the structures of the type shown in the above-noted patents relate to the attachment of the lure assembly to the bait fish or the limited space in which the bait fish is displayed and the generally unrealistic means of capturing and display wherein such lures frequently completely isolate the bait fish from the surrounding waters.

Accordingly, there is still a need in the sports fishing area for a lure structure or assembly capable of displaying a live bait fish in a protected fashion but establishing communication with the bait fish with the surrounding waters while at the same time providing a large enough retaining chamber so as to allow free and natural type movements of the bait fish within the lure assembly.

SUMMARY OF THE INVENTION

The present invention relates to a lure structure including an elongated housing formed of a transparent flexible material and defining a chamber on the interior thereof. The chamber is structured and dimensioned to retain and display a bait fish and in addition is large enough to allow natural type movement of the bait fish. In addition, the lateral wall and end wall substantially defining the housing are formed of an apertured construction so as to allow free exposure and flow of water therethrough and to the bait fish maintained within the chamber of the housing. This free communication with water of course occurs when the lure structure is secured to a fishing line and is submerged. In addition, the lure structure includes its attachment to a fishing line substantially adjacent to a hook assembly for the hooking of a larger sports fish. Alternately, the hooking assembly may be secured directly to the housing but in any event should not be of a distance spaced from the housing to avoid hooking of the fish intended to be caught.

Another feature of the present invention includes an entrance means for providing access to the chamber or interior of the housing and inserting the bait fish therethrough. The entrance means is structured so as to at least partially define one end wall of the housing and facilitate passage of a bait fish or like object into the interior of the chamber of the housing while at the same time resisting movement or passage of the bait fish outwardly from the chamber to the exterior of the housing.

A connecting means is provided to secure the housing to the fishing line substantially adjacent a hook assembly if in fact a hook assembly is not secured directly to the housing. In a preferred embodiment, to be described in greater detail hereinafter, an elongated channel extending at least partially along the length of the housing includes a clear through passage dimensioned to receive a length of the fishing line therethrough such that at least minimal sliding movement of the housing on the fishing line may occur.

A further important structural feature of the present invention is the manufacture and forming of the housing from a lightweight, flexible yet transparent material. This enables natural movement of the bait fish retained within the chamber of the housing to be communicated directly to the lure assembly itself. Accordingly, any movement, such as the snapping of the tail of a retained shrimp, will cause a jerking or flipping action of the housing due to the flexible lightweight construction thereof which will further aid in the attraction of larger sports fish to such movement.

The invention accordingly comprises the features of construction, a combination of elements and arrangement of parts which will be exemplified in the construction hereinafter set forth, and the scope of the invention will be indicated in the claims.

BRIEF DESCRIPTION OF THE DRAWINGS

For a full understanding of the nature of the present invention, reference should be had to the following detailed description taken in connection with the accompanying drawings in which:

FIG. 1 is an isometric view of the lure structure of the present invention mounted on a fishing line adjacent to a hook assembly.

FIG. 2 is a sectional view of the embodiment of FIG. 1 with a bait fish, such as a shrimp, mounted on the interior chamber thereof.

FIG. 3 is an end view along line 3—3 of FIG. 1.

FIG. 4 is an isometric view of another embodiment of the present invention primarily designed to hold bait fish of a different configuration.

FIG. 5 is a sectional view showing a bait fish on the interior of the embodiment of FIG. 4 and taken along line 5—5 thereof.

FIG. 6 is an end view along line 6—6 of FIG. 5 showing structural detailed of the entrance at one end of the housing of the subject lure structure.

DETAILED DESCRIPTION OF THE PREFERRED EMBODIMENT

As shown in FIGS. 1-6, the present invention is directed to a lure structure generally indicated as 10 which, in the embodiment of FIGS. 1-3, has an elongated configuration defined by a lateral wall 12 of a housing disposed in surrounding relation to an interior chamber 14. The ends of the chamber are defined by end walls 16 and 18 terminating at the ends of the lateral wall 12 and disposed in generally transverse relation to the longitudinal axis of the housing 13. The housing 13 and more particularly the lateral wall 12 and at least one of the end walls 16 is formed of a flexible transparent and lightweight plastic material including a plurality of integrally formed apertures 20 formed therein. The apertures of course are provided to allow free entrance and exiting and free flow of water into the interior chamber 14 in which a bait fish 21 is retained and displayed. The transparency of the material from which the housing 13 is formed allows clear display of the bait fish while its lightweight flexible construction allows any movement of the bait fish to be transferred to the housing itself as a jerking or snapping movement commonly associated with bait fish of various types.

With the reference to FIGS. 4, 5 and 6 a second embodiment of the present invention is indicated as 10' and is of a similar structure except that the longitudinal dimension of the housing and of course the retaining chamber 14 is less than twice as great as the transverse dimension of the housing or the diameter of one of the end walls 16 or 18. This shape is better suited to the display and retention of a variety of other types of bait fish 23 other than a shrimp 21. To the contrary, the embodiment of FIGS. 1-3 is of an elongated dimension wherein the longitudinal dimension is at least twice as great as the transverse dimension or diameter of one of the ends 16 and 18.

In both embodiments, an entrance means is provided to define one end, preferably 18, such that the entrance means include a plurality of adjacently positioned and separable segments 26 (and 26', see FIG. 6). Each of the plurality of segments 26 is formed into a substantially triangular configuration wherein the base of each segment is integrally formed or otherwise connected to the remainder of the end wall 18 but the peripheral edges of each segment 26 converge to a common central point 30 (30', FIG. 6). Each of the segments 26 is separated from the next adjacent segment by a separable seam 29 contiguous to the peripheral edge of the adjacent segments but allowing separation thereof into an open position (see FIG. 2) wherein the outer ends of each segment are forced open towards the interior of the chamber 14 to allow passage of a bait fish therethrough. Further, as shown in FIG. 2, when the entrance segments 26 are in a closed position each of the pointed ends of the segments converge to a common point 30, set forth above, but are still directed inwardly toward the interior of the chamber 14 and out of a normal plane of the end wall 18. This orientation of the plurality of segments, when in an entrance closed position, resists passage of the bait fish 21, 23 back out through the entrance. While such may be accomplished with forced removal of the bait fish, such bait fish cannot inadvertently escape from the chamber 14.

Another feature of the present invention is the connecting means which, in the embodiment of FIG. 2, includes an elongated channel 40 having an internal clearthrough passage 42 being open at both ends and further being dimensioned to allow the insertion and passage therethrough of fishing line 50. The fishing line 50, at its opposite end, may be connected to a hook assembly or the like 55. The dimension of the interior passage 42 of channel 40 is such as to allow at least minimal sliding movement of the housing 13 along a length of the fishing line 50 as indicated by directional arrow 57. However, the travel of the housing 13 may be limited by a swivel or purposely placed knot 59 along the length of the fishing line 50 spaced from the hook assembly 55.

In the embodiment of FIGS. 4 and 5, the connecting means includes a first channel segment 52 extending transversely to the longitudinal axis of the housing 13 and substantially across the diameter of the leading end wall 16. The connecting means further includes a second channel segment 54 spaced from but communicating with the first channel segment 52 and extending along the length of the lateral housing 12. Both of the respective channel segments include an elongated through passage dimensioned and configured to permit the fishing line 50 to pass therethrough successively first through channel segment 52 and subsequently through channel segment 54. Protrusion of the fishing line 50 from the distal or endmost opening of the passage of the second channel segment 54 allows connection thereto of a hook assembly 55.

It is therefore to be understood that the following claims are intended to cover all of the generic and specific features of the present invention herein described, and all statements of the scope of the invention which as a matter of language, might be said to fall therebetween.

Now that the invention has been described,

What is claimed is:

1. A fishing lure structure of the type primarily designed to retain and display a live bait fish substantially adjacent a hook assembly for the attraction of a larger fish thereto, said assembly comprising:
   (a) a housing having a substantially elongated configuration and a hollow interior portion extending along the length thereof, said hollow interior portion defining a chamber in which the bait fish is retained,
   (b) said chamber including both a transverse and longitudinal dimension sufficient to retain and allow free movement of the live bait fish therein,
   (c) said housing further including an elongated, lateral wall disposed in surrounding relation to said chamber,
   (d) said housing having two end walls formed at opposite ends of said lateral wall and disposed in substantially tranverse relation to the length of said housing,
   (e) resiliently segmented entrance means for providing access into and out of said chamber being formed on and at least partially defining one of said end walls, said entrance means structured to facilitate entrance into said chamber and resist exiting therefrom,
   (f) said lateral wall formed from a transparent material, whereby said bait fish is displayed, and including a plurality of apertures formed in said lateral wall, said plurality of apertures disposed and dimensioned to allow water to fill said housing and freely flow into and out of said chamber, and (g) connecting means secured to said housing for attachment of said lure assembly to a fishing line.

2. An assembly as in claim 1 wherein said lateral wall is formed from a flexible material.

3. An assembly as in claim 2 wherein the other of said end walls opposite of said entrance means is formed from a transparent material of apertured construction.

4. An assembly as in claim 1 wherein said housing is mounted on the fishing line in substantially aligned and parallel orientation to a segment of the line secured to said connecting means.

5. A structure as in claim 4 wherein said entrance means and the corresponding end wall on which it is formed defines a trailing end of said housing when said housing is secured to a fishing line.

6. A structure as in claim 5 wherein the other of said end walls relative to said entrance means defines a leading end of said housing when secured to the fishing line.

7. A structure as in claim 6 wherein the other of said end walls opposite said entrance means is formed of a transparent material of apertured construction.

8. A structure as in claim 1 wherein said entrance means comprises a plurality of end wall segments each movably separated from a next adjacent segment along a peripheral seam disposed contiguously between each adjacent segment.

9. A structure as in claim 8 wherein each of said segments comprise a substantially triangular configuration having a base connected to said corresponding end wall and the remaining sides of each triangularly configured segment converging to a common point, said plurality of segments movable relative to one another toward an interior of said chamber to define an entrance open position and movable back into an entrance closed position defined by said plurality of segments converging to said common point.

10. A structure as in claim 9 wherein said entrance closed position is further defined by said plurality of segments oriented into the interior of said chamber and out of a plane defined by said corresponding end wall.

11. A structure as in claim 1 wherein said connecting means comprises an elongated channel having an open ended passage extending therethrough, said channel extending along a length of said lateral wall and said passage dimensioned to receive a fish line therethrough.

12. A structure as in claim 11 wherein said channel end passage is disposed and dimensioned to allow sliding movement of said housing relative to said fishing line in a direction parallel to a central longitudinal axis of said housing.

13. A structure as in claim 12 wherein the longitudinal dimension of said housing is at least twice as great as the transverse dimension thereof.

14. A structure as in claim 1 wherein the longitudinal dimension of said housing is less than twice as great as the transverse dimension of said housing.

15. A structure as in claim 1 wherein said connecting means comprises a channel means for securing a fishing line to said housing, said channel means comprising a first channel segment extending along a length of a leading end wall of said housing and a second channel segment extending along a length of the lateral wall of said housing, each of said channel segments comprising a respective passage extending therethrough, each of said passages dimensioned to receive a fishing line along the length thereof, said first and second channel segments relatively disposed such that the fishing line extends successively through said first channel segment and through said second channel segment.

* * * * *